United States Patent
Collins et al.

(10) Patent No.: US 9,658,312 B2
(45) Date of Patent: May 23, 2017

(54) LOCATION DETECTION SYSTEM AND METHOD

(71) Applicant: Dublin City University, Dublin (IE)

(72) Inventors: Kevin Collins, County Cork (IE); Kevin Anthony McGuinness, Dublin (IE); Noel Edward O'Connor, Dublin (IE)

(73) Assignee: DUBLIN CITY UNIVERSITY, Glasnevin (IE)

( * ) Notice: Subject to any disclaimer, the term of this patent is extended or adjusted under 35 U.S.C. 154(b) by 0 days.

(21) Appl. No.: 14/914,942

(22) PCT Filed: Aug. 26, 2014

(86) PCT No.: PCT/EP2014/068098
§ 371 (c)(1),
(2) Date: Feb. 26, 2016

(87) PCT Pub. No.: WO2015/028474
PCT Pub. Date: Mar. 5, 2015

(65) Prior Publication Data
US 2016/0202342 A1   Jul. 14, 2016

(30) Foreign Application Priority Data
Aug. 26, 2013  (GB) .................................. 1315185.7

(51) Int. Cl.
*H04W 24/00* (2009.01)
*G01S 5/02* (2010.01)
(Continued)

(52) U.S. Cl.
CPC .......... *G01S 5/0252* (2013.01); *G01S 5/0278* (2013.01); *H04B 17/318* (2015.01);
(Continued)

(58) Field of Classification Search
CPC .... G01S 5/0252; G01S 5/0278; H04W 24/10; H04W 4/021; H04W 64/00; H04L 43/045; H04B 17/318
(Continued)

(56) References Cited

U.S. PATENT DOCUMENTS 6,263,208 B1   7/2001  Chang et al.
7,522,049 B2   4/2009  Aljadeff et al.
(Continued)

FOREIGN PATENT DOCUMENTS

WO    0069198 A1    11/2000
WO    2011014292 A1  2/2011
WO    2012170389 A1  12/2012

OTHER PUBLICATIONS

International Search Report and Written Opinion for PCT/EP2014/068098 dated Nov. 17, 2014.
(Continued)

*Primary Examiner* — Amancio Gonzalez
(74) *Attorney, Agent, or Firm* — Meagher Emanuel Laks Goldberg & Liao, LLP

(57) ABSTRACT

A system and method for detecting the location of a mobile device within an area, uses a plurality of wireless signals sent to or received by the device to derive a first estimate of the position of the device. This position estimate is then adjusted using a probabilistic model of the area, where the area is divided into zones or regions, and where each region is assigned a weighting according to the probability of the device being located in that region taking account of the prior position of the device. By using the weightings to adjust the position estimate, false or ambiguous position estimates are discounted and the true position of the device is more reliably detected. The method also includes techniques to take account of different wireless characteristics of
(Continued)

different devices when each is supplied with the same model.

20 Claims, 13 Drawing Sheets

(51) Int. Cl.
  *H04B 17/318* (2015.01)
  *H04L 12/26* (2006.01)
  *H04W 4/02* (2009.01)
  *H04W 24/10* (2009.01)
  *H04W 64/00* (2009.01)
(52) U.S. Cl.
  CPC ........... *H04L 43/045* (2013.01); *H04W 4/021* (2013.01); *H04W 24/10* (2013.01); *H04W 64/00* (2013.01)
(58) Field of Classification Search
  USPC ...................................................... 455/456.2
  See application file for complete search history.

(56) References Cited

U.S. PATENT DOCUMENTS

| | | | |
|---|---|---|---|
| 7,876,266 B2 | 1/2011 | Rhoads | |
| 7,933,612 B2 | 4/2011 | Counts et al. | |
| 8,150,367 B1 | 4/2012 | Malladi et al. | |
| 8,554,246 B2 * | 10/2013 | Boyer | H04W 64/00 342/378 |
| 2005/0131635 A1 | 6/2005 | Myllymaki | |
| 2005/0197139 A1 | 9/2005 | Misikangas | |
| 2007/0149216 A1 | 6/2007 | Misikangas | |
| 2010/0008337 A1 | 1/2010 | Bajko | |
| 2010/0259450 A1 | 10/2010 | Kainulainen et al. | |
| 2011/0018769 A1 | 1/2011 | Misikangas | |
| 2011/0028160 A1 | 2/2011 | Roeding | |
| 2011/0029359 A1 | 2/2011 | Roeding | |
| 2011/0029370 A1 | 2/2011 | Roeding | |
| 2012/0056785 A1 | 3/2012 | Jovicic | |
| 2012/0225663 A1 | 9/2012 | Gupta et al. | |
| 2012/0258669 A1 | 10/2012 | Honkanen et al. | |
| 2013/0035110 A1 | 2/2013 | Sridhara | |
| 2013/0107728 A1 | 5/2013 | Zhu et al. | |
| 2013/0131973 A1 | 5/2013 | Friedler et al. | |
| 2013/0191019 A1 | 7/2013 | Pakzad | |

OTHER PUBLICATIONS

Chang, C. et al. "LIBSVM: A Library for Support Vector Machines" ACM Transactions on intelligent Systems and Technology, 2:27:1-27:27, (2011).

Sinkhorn, R. et al, "Concerning Nonnegativematrices and Doubly Stochastic Matrices" Pacific Journal of Mathematics, vol. 21, No. 2, pp. 343-348, (1967).

* cited by examiner

Fig. 7

$$\begin{bmatrix}
2.49 \times 10^{-01} & 3.86 \times 10^{-03} & 3.72 \times 10^{-06} & 3.86 \times 10^{-03} & 3.72 \times 10^{-06} & 2.23 \times 10^{-10} & 3.72 \times 10^{-06} & 8.32 \times 10^{-16} \\
3.86 \times 10^{-03} & 2.49 \times 10^{-01} & 3.86 \times 10^{-03} & 3.70 \times 10^{-06} & 2.23 \times 10^{-10} & 8.32 \times 10^{-16} & 2.23 \times 10^{-10} & 1.92 \times 10^{-22} \\
3.72 \times 10^{-06} & 3.86 \times 10^{-03} & 2.49 \times 10^{-01} & 2.23 \times 10^{-10} & 8.32 \times 10^{-16} & 1.92 \times 10^{-22} & 8.32 \times 10^{-16} & 2.77 \times 10^{-30} \\
3.86 \times 10^{-03} & 3.72 \times 10^{-06} & 2.23 \times 10^{-10} & 2.49 \times 10^{-01} & 3.86 \times 10^{-03} & 3.72 \times 10^{-06} & 3.86 \times 10^{-03} & 2.23 \times 10^{-10} \\
3.72 \times 10^{-06} & 2.23 \times 10^{-10} & 8.32 \times 10^{-16} & 3.86 \times 10^{-03} & 2.49 \times 10^{-01} & 3.86 \times 10^{-03} & 3.72 \times 10^{-06} & 8.32 \times 10^{-16} \\
2.23 \times 10^{-10} & 8.32 \times 10^{-16} & 1.92 \times 10^{-22} & 3.72 \times 10^{-06} & 3.86 \times 10^{-03} & 2.49 \times 10^{-01} & 2.23 \times 10^{-10} & 1.92 \times 10^{-22} \\
3.72 \times 10^{-06} & 2.23 \times 10^{-10} & 8.32 \times 10^{-16} & 3.86 \times 10^{-03} & 3.72 \times 10^{-06} & 2.23 \times 10^{-10} & 2.49 \times 10^{-01} & 3.86 \times 10^{-03} \\
8.32 \times 10^{-16} & 1.92 \times 10^{-22} & 2.77 \times 10^{-30} & 2.23 \times 10^{-10} & 8.32 \times 10^{-16} & 1.92 \times 10^{-22} & 3.86 \times 10^{-03} & 2.49 \times 10^{-01}
\end{bmatrix}$$

Fig. 8

$$\begin{bmatrix}
9.70 \times 10^{-01} & 1.50 \times 10^{-02} & 1.46 \times 10^{-05} & 1.49 \times 10^{-02} & 1.45 \times 10^{-05} & 8.76 \times 10^{-10} & 1.45 \times 10^{-05} & 3.26 \times 10^{-15} \\
1.50 \times 10^{-02} & 9.70 \times 10^{-01} & 1.52 \times 10^{-02} & 1.44 \times 10^{-05} & 8.69 \times 10^{-10} & 3.26 \times 10^{-15} & 8.69 \times 10^{-10} & 7.56 \times 10^{-22} \\
1.46 \times 10^{-05} & 1.52 \times 10^{-02} & 9.85 \times 10^{-01} & 8.69 \times 10^{-10} & 3.26 \times 10^{-15} & 7.62 \times 10^{-22} & 3.26 \times 10^{-15} & 1.10 \times 10^{-29} \\
1.49 \times 10^{-02} & 1.44 \times 10^{-05} & 8.69 \times 10^{-10} & 9.55 \times 10^{-01} & 1.49 \times 10^{-02} & 1.45 \times 10^{-05} & 1.49 \times 10^{-02} & 8.69 \times 10^{-10} \\
1.45 \times 10^{-05} & 8.69 \times 10^{-10} & 3.26 \times 10^{-15} & 1.49 \times 10^{-02} & 9.70 \times 10^{-01} & 1.52 \times 10^{-02} & 1.45 \times 10^{-05} & 3.26 \times 10^{-15} \\
8.76 \times 10^{-10} & 3.26 \times 10^{-15} & 7.62 \times 10^{-22} & 1.45 \times 10^{-05} & 1.52 \times 10^{-02} & 9.85 \times 10^{-01} & 8.76 \times 10^{-10} & 7.62 \times 10^{-22} \\
1.45 \times 10^{-05} & 8.69 \times 10^{-10} & 3.26 \times 10^{-15} & 1.49 \times 10^{-02} & 1.45 \times 10^{-05} & 8.76 \times 10^{-10} & 9.70 \times 10^{-01} & 1.50 \times 10^{-02} \\
3.26 \times 10^{-15} & 7.56 \times 10^{-22} & 1.10 \times 10^{-29} & 8.69 \times 10^{-10} & 3.26 \times 10^{-15} & 7.62 \times 10^{-22} & 1.52 \times 10^{-02} & 9.85 \times 10^{-01}
\end{bmatrix}$$

LOCATION DETECTION SYSTEM AND METHOD

TECHNICAL FIELD

This invention relates to systems and methods for use in detection of location. It has particular application in environments where the global positioning system (GPS) is unavailable or unreliable, and also has particular application for users of devices which are not GPS enabled.

BACKGROUND ART

GPS requires an unobstructed line of sight to a number of satellites. Therefore, in locations with restricted visibility of the open sky, GPS is normally unavailable. One example of such an environment, though not the only field of application for this invention, is an indoor setting. Another example is outdoors in an urban area or a wooded area where there is limited visibility of the sky.

The problem of indoor location detection has been addressed in different ways. Custom Ultra Wide Band (UWB) hardware units can be installed at regular intervals throughout a facility, to spread signals throughout the facility, and custom hardware tags can be attached to assets that are to be tracked. The approach is accurate and has been adopted by manufacturers such as car and airplane makers to track the location of components and vehicles, but is expensive and only affordable for high end manufacturing processes.

Any system relying on tracking physical tags is not applicable to allowing end users to employ standard consumer technology such as mobile phones and PDAs to determine their location in an indoor environment or other environment where GPS is unavailable or unreliable.

Another approach is found in U.S. Pat. No. 7,876,266 which replicates a GPS-like solution using wireless signals. It requires several collaborating devices to generate solutions which satisfy the accumulation of time-stamped pings received by the plurality of devices from multiple nodes.

WO 2011/014292 discloses a system based on ultrasonic detection. Transmitters in a location such as a store transmit identifiers encoded in an ultrasound signal. The signal is received by a microphone of a mobile phone, allowing an app on the phone to infer location. Granularity is limited to determining that the phone is within range of a given transmitter, e.g. that the device is within a store.

US 2005/0131635 discloses using a probabilistic model of a wireless environment such as a wireless local area network or WLAN. The model indicates a probability distribution for signal values at several sample points in the wireless environment. A set of observations of signal values is made and the target device's location is estimated based on the probabilistic model and the set of observations. An error estimate is determined as a combination of products over several sample points, with each product comprising a probability distribution for the sample point in question being the target device's location, and a distance function between the sample point in question and the target device's estimated location.

Approaches based on signal strength, such as US 2005/0131635, require a probabilistic model of some sort. Signal strength-based location detection can be carried out in a region provided with a number of routers or wireless access points (WAPs) which together provide a wireless local area network (WLAN) or a number of such networks. Regardless of whether the WAPs are part of the same network or are in different networks, a user's mobile device can detect each WAP by its MAC address or basic service set identification (BSSID) which the WAP broadcasts at regular periodic intervals. Thus, a wireless device can scan the relevant portion of the spectrum, identify broadcast packets, and identify each WAP within range. For each WAP the signal strength can be (and typically is) measured as a decibel value.

In theory, therefore, at any given point within the region there should be a unique wireless signal environment or fingerprint composed of signals each of a different strength. The fingerprint should be unique because signal strength is primarily governed by an inverse square law, and with multiple WAPs surrounding a device each point in space should be uniquely identifiable as a set of signal strengths each of which follows this law.

In practice however the situation is not as clean as theory would suggest. Signal strengths measured by a device fluctuate and are not constant, even if the WAP and device are stationary. The inverse square law does not take account of a physical environment such as is typically found indoors or in areas with walls, partitions, or obstacles, where any signal can exhibit the effects of blockage, attenuation, reflection, interference (both with itself and with other signals, both from the wireless network and from other sources). It is therefore observed that attempts to locate a device by matching the detected set of observed signal strengths to a database of previously observed signal strengths at the same location, provides poor results which may be ambiguous or which may even give an entirely wrong location. This problem is exacerbated in some environments more than others, and is worse with some devices than with others.

Other approaches to location detection known to the inventor are described in U.S. Pat. No. 7,522,049; US 2011/0018769; U.S. Pat. No. 8,150,367; WO 2012/170389; U.S. Pat. No. 7,933,612; EP 2 217 942; EP 2 307 903; US 2012/0258669; US 2012/0225663; US 2011/0029370; US 2011/0029359, and US 2011/0028160.

DISCLOSURE OF THE INVENTION

There is provided a method for detecting the location of a mobile device within an area, comprising the steps of:
  storing a prior location estimate for the device;
  determining, for each of a plurality of zones in said area, a signal-based value indicative of the likelihood of the device being located in the respective zone, based on measured wireless signal characteristics;
  maintaining a set of transition values, each transition value representing a likelihood of a device moving between a pair of said zones;
  calculating, for each of a plurality of zones in said area, a current location value by using a matrix-based approach to combine (i) the prior location estimate, (ii) said set of transition values, and (iii) said signal-based values;
  wherein said set of transition values includes at least one transition value representing the likelihood of the device moving between a pair of zones which are physically accessible from one another and at least one transition value representing the likelihood of the device moving between a pair of zones which are physically inaccessible from one another; and
  wherein said step of calculating a current location value includes using a discriminative model to calculate a current location value for at least one zone physically accessible from a zone corresponding to the prior location estimate, and a current location value for at least one zone physically inaccessible from said zone corresponding to the prior location estimate.

Like several previous approaches, the method initially involves measurement of wireless signal characteristics and comparison with known, expected or inferred signal strengths across the area to get an initial fix on the position of the device. However, this estimate is then refined using the prior location and the transition values. Given the device's prior location and the likelihood of transitioning from that prior location to each of a number of locations, including locations that are not physically accessible from the prior location, the likelihood that the device is actually in each of those locations calculated purely on wireless signal characteristics can be modified.

Thus, for example, it may be known that a device was previously in a given zone $z8$ within an area composed of multiple such zones, $z1, z2, \ldots z8, \ldots zn$. A short time later, the measured signal strengths may provide an ambiguous location indication (such as 25% probability that the device is in zone $z3$, a 35% probability that the device is in zone $z11$ and a 30% probability that the device is in zone $z28$, a 7% probability that the device is still in zone $z8$, and a combined 3% aggregate probability that the device is in some other zone).

The known prior location $z8$ can be used in combination with the transition values indicating the likelihood that the device has moved between zone $z8$ and each of zones $z3$, $z11$ and $z28$ (as well as the likelihood that it will have stayed in zone $z8$). If it is much more likely that a device will have transitioned to e.g. zone $z11$ from $z8$, then the signal-based indication of 35% may be strengthened to an overall current location value of e.g. 70% for $z11$, with the values for $z3$ and $z28$ correspondingly lowered.

Prior approaches have considered transitions between directly connected neighbouring zones, and have been based on the use of room-sized zones. Such an approach can work for room level location with devices traveling at walking speeds, and where the degree of confidence in the prior location is sufficiently high to be relied upon unambiguously. The present approach considers the possibility of transitioning to all zones. When zones become smaller this is important as someone may move to a zone/zone boundary via an intermediate zone or x intermediate zones quite quickly. Also, the correction of an erroneous prior location can be hastened where the possibility of transitions even between unconnected zones is allowed for.

Preferably, in a system of N zones, the prior location estimate comprises a set of N values $(p1, p2, \ldots pN)$; the set of transition values comprises a set of $N^2$ values expressible as a N×N transition matrix T, and the signal-based values comprise a set of N values $(s1, s2, \ldots sN)$.

The step of calculating, for each of a plurality of zones in said area, a current location value preferably comprises obtaining the matrix product of a 1×N matrix having elements $[(p1 \times s1)\ (p2 \times s2) \ldots (pN \times sN)]$ and the transition matrix T, resulting in a 1×N location matrix whose elements $e1, e2, \ldots eN$ are indicative of the likelihood of the device being in each of the N zones respectively.

This matrix-based approach allows account to be taken of all possible transitions and the signal-based values expressed for all possible locations, including those that would not have been taken into consideration in previous approaches that considered only transitions between connected locations or zones. Using a discriminative model to calculate the current location value means that more complex signal environments can be handled by collecting multiple ground truth points per zone, and discriminating between zones using complex non-linear decision boundaries.

Preferably, said transition matrix T is doubly stochastic.

A doubly stochastic matrix is a square matrix of nonnegative real numbers, each of whose rows and columns sum to 1, used in probability and combinatorics. By considering all transitions accuracy can be maintained. A doubly stochastic matrix is a mathematical mechanism that allows all transitions to be considered: when the transition probabilities are represented as a doubly stochastic matrix and we do a matrix product with a vector of zone probabilities that sum to one the result is a vector of probabilities that sum to 1.

In the graphical model enhancement algorithm we do a matrix product of the doubly stochastic transition probability matrix and the row vector of current zone probabilities. This gives us our prior vector a location estimate based on our last best guess updated to consider the likelihood of transitioning.

Preferably, the method further comprises the step of storing one or more of said calculated current location values, and on a further iteration, using the stored current location values as the prior location estimate.

Storing a current location estimate as a prior location estimate for a future iteration can also allow the generation of a modifier for the transition values. So for example, if the method is repeated every 2 seconds, and on successive iterations, the degree of confidence that the device is in a given zone begins to decrease, while the probability that it is in a neighbouring zone starts to increase, this may indicate that the device is moving towards a boundary with that neighbouring zone. In such cases, the transition value associated with remaining in the current zone may be decreased, while the transition value associated with moving to that neighbouring zone may be increased.

Preferably, on an initial iteration, the prior location estimate is initialised to a stored default value or set of values.

For example, the prior location estimate may be initialised to a set of values with equal probability for all zones. Alternatively, and particularly where the region in question has well defined entrance points, the prior location estimate may be initialised to values which reflect an assumption that on a first iteration the device will be in the vicinity of one of those entrance points, perhaps weighted to reflect the traffic levels at each entrance point.

Preferably, the prior location estimate is stored as a set of values, each associated with a respective one of the plurality of zones, representing the likelihood of the device having been in the respective zone on a prior iteration of the method.

Preferably, the set of transition values is calculated from a representation of said zones as a graph of vertices and edges, each zone being represented as a vertex and being connected to at least one other vertex by an edge.

The terms "graph", "vertex" and "edge" as used above reflect usage in graph theory to model pairwise relationships between objects.

Preferably, said set of transition values is calculated such that each transition value is a function of the distance between a pair of vertices in the graph.

Preferably, the distances between pairs of vertices are weighted.

Preferably, the weighting is assigned based on one or more of: physical distance between zones, physical barriers between zones, traffic patterns between zones, and time to transition between zones.

Preferably, each transition value is also a function of a tuneable parameter.

Preferably, the method further comprises the steps of modifying said tuneable parameter and adjusting the transition values in consequence.

Preferably, said tuneable parameter is modified in accordance with a calculated or estimated speed of movement of the device.

Preferably, said tuneable parameter is modified in accordance with a calculated or estimated congestion value associated with movement within said area.

Preferably, said tuneable parameter is modified in accordance with a value associated with the time between successive iterations of the method.

Preferably, the step of determining signal-based values comprises measuring, by the device, a plurality of wireless signal strengths, and comparing said measured signal strengths with a set of reference signal strengths associated with each of the plurality of zones.

Preferably, the measured signal strengths are adjusted before comparison using one or more of the following transformations:

in the event of no signal being detected from a previously detected wireless signal source, replacing a null value for said source with a previously measured value;

normalising the signal strength values to a common range;

shifting the signal strength values to reduce differences between wireless characteristics of the mobile device and those of a reference device from which the reference signal strengths were derived; and calculating a standard z-score as follows:

$$Z = \frac{x - \mu}{\sigma}$$

where x is the measured signal strength, $\mu$ is the mean signal strength, and $\sigma$ is the standard deviation.

The transformations above allow the measured signal values to be adjusted to take account of different signal receiving and signal processing abilities between disparate devices. It has been found that dropping null values, normalising to a common range, and shifting the signal strength values can each greatly reduce errors and improve consistency of measurement between devices with different antennae, different wireless cards and chips, and different radio processing hardware and firmware.

Preferably, device specific parameters may be selected for the transformations according to the specific type of mobile device used to measure the signal strengths.

Preferably, the device specific parameters may be obtained by analysing measured signal strengths of the specific type of mobile device used.

Preferably, said step of calculating a current location value comprises adjusting the signal-based value for each zone according to a weighting derived from the prior location estimate, said weighting indicating the likelihood of the device having been in that zone on a previous iteration, resulting in an enhanced signal-based value for each of said zones; and combining the enhanced signal-based value for each zone with the transition values for each zone pair involving that zone, to result in a current location value for each zone.

Preferably, the step of calculating a current location value includes determining whether the device is in a boundary region adjacent to the meeting of two or more zones, wherein for each candidate location $L_i$ of n location candidates $L_1, L_2, L_3, \ldots, L_n$, a probability value Pad is assigned according to the likelihood of the device being in that candidate location, and wherein the determination that the device is in a boundary region between two locations $L_i$, $L_j$ is made where the following conditions are met:

$$P(L_i|s) > P(L_j|s) > P(L_k|s),$$

for i, j, k=1, 2, 3, ..., n, k≠j≠i.

and $P(L_i|s) - P(L_j|s) < c,$ where c is a tuneable parameter and c<1, and and s is the observed signal strength vector on the mobile device.

If $P(L_i|s) - P(L_j|s)$ is c or greater, then the determination is made that the device is not in the boundary region and that it is in location $L_i$. The value of c can be chosen based on testing and can be assigned specifically to a given environment. It can be different for different parts of the region in which the zones or locations are situated, i.e. the value of c can vary for different value pairs i, j.

The determination that the device is at a boundary can be dependent on whether or not the two largest probability values in the set of n probability values relate to adjacent zones or locations. Alternatively, the determination of the conditions set out above can be made for whichever location $L_i$ is assigned the largest probability value and for each neighbouring location $L_j$.

BRIEF DESCRIPTION OF THE DRAWINGS

The invention will now be further illustrated by the following description of embodiments thereof, given by way of example only with reference to the accompanying drawings, in which:

FIG. 7 is a transition potential matrix;

FIG. 8 is a normalised transition probability matrix generated from the transition potential matrix of FIG. 7;

DETAILED DESCRIPTION OF PREFERRED EMBODIMENTS

Figure 1:
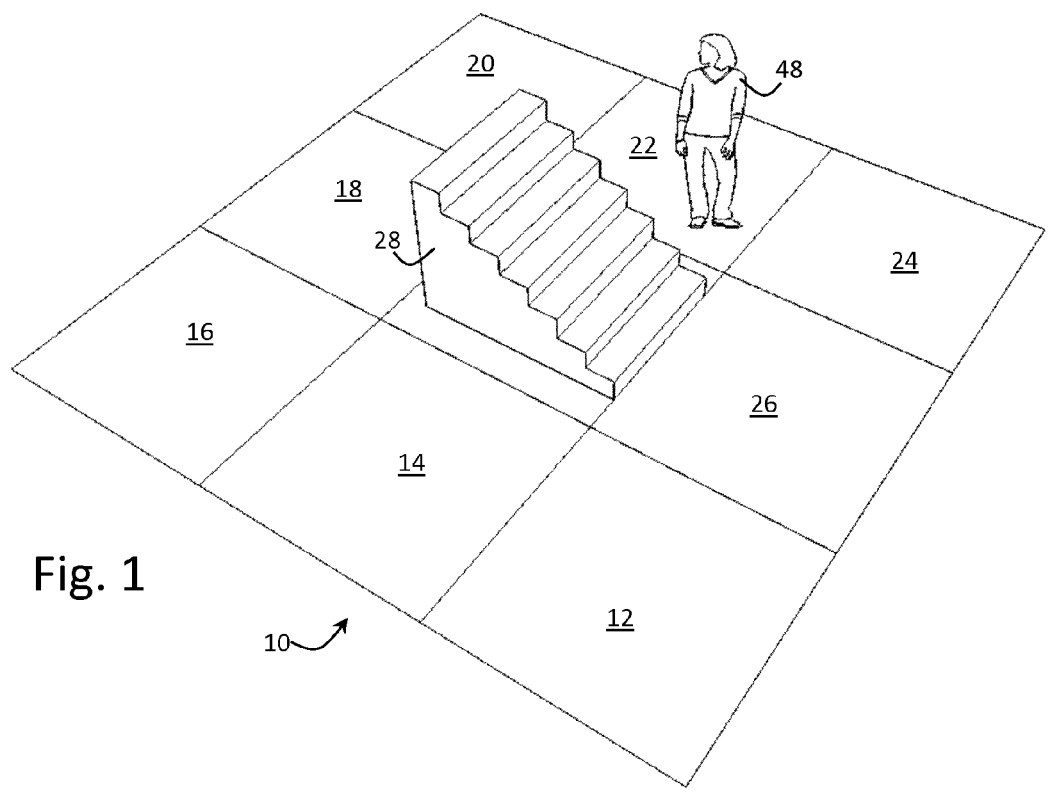
FIG. 1 is a schematic layout of a first floor of a building.
Figure 2:
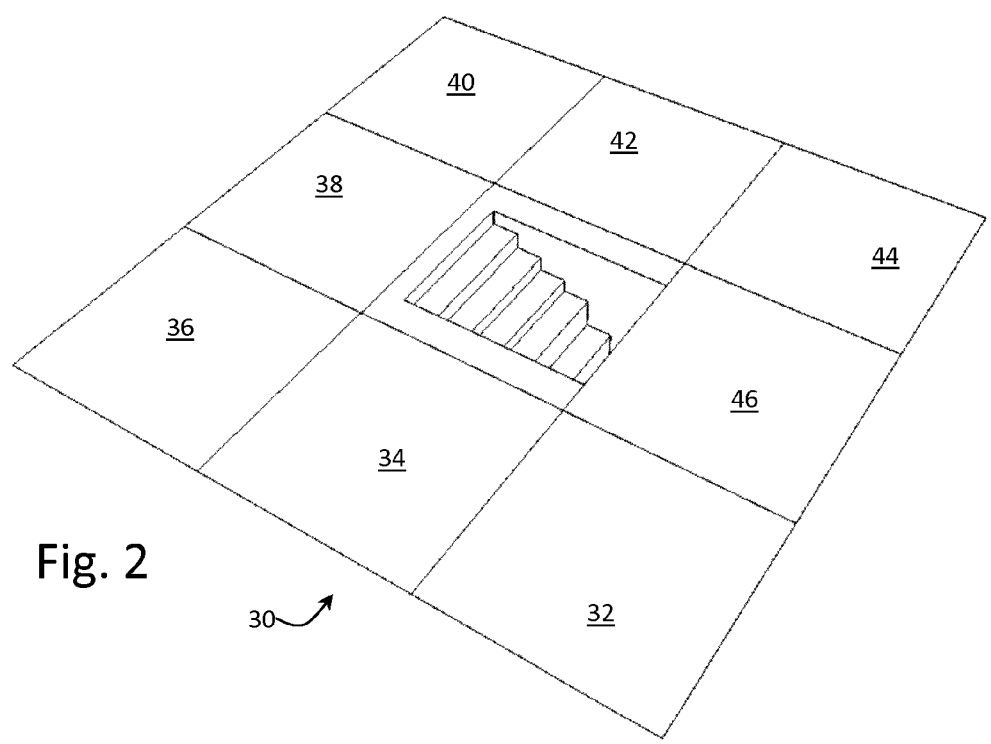
FIG. 2 is a schematic layout of a second floor of a building.

FIGS. 1 and 2 show schematic layouts of a first floor 10 (FIG. 1) and second floor 30 (FIG. 2) of a building. The combined floor area of the first and second floors combined constitutes a region in which the location detection method and apparatus is used.

On the first floor the space is subdivided into 9 zones 12, 14, 16, 18, 20, 22, 24, 26. A staircase 28 leads up to the second floor 30, which is similarly divided into nine zones 32, 34, 36, 38, 40, 42, 44, 46. A user 48 is located in one of the zones 22, and that user is equipped with a mobile phone or other mobile device (tablet, PDA, laptop computer) having wireless internet (wifi) capability. The user and the device (not shown) will both be referred to with reference numeral 48.

Distributed at intervals around the first floor 10 and second floor 30 are a set of WAPs (not shown) which can form part of the same or several different wireless networks. As described previously the device 48 can make a probabilistic estimate of its location by observing signal strengths from each detectable WAP and attempting to fit the set of observations to a database of sets of signal strength measurements according to location.

Such a database can have a single entry (i.e. set of expected signal strengths from each WAP) per zone, or there can be multiple entries per zone, to take account of the fact that the wireless environment or fingerprint observable beside a wall in a given zone may be very different to that observable in the middle of the floor space, or beside an obstacle, or beside another wall.

The method involves improving on the bare signal-based measurements that would be achieved by comparing fingerprints to a database, but to do so a graphical model is employed. The generation of this graphical model will now be described in four steps.

1—Generation of Graph

Figure 3:
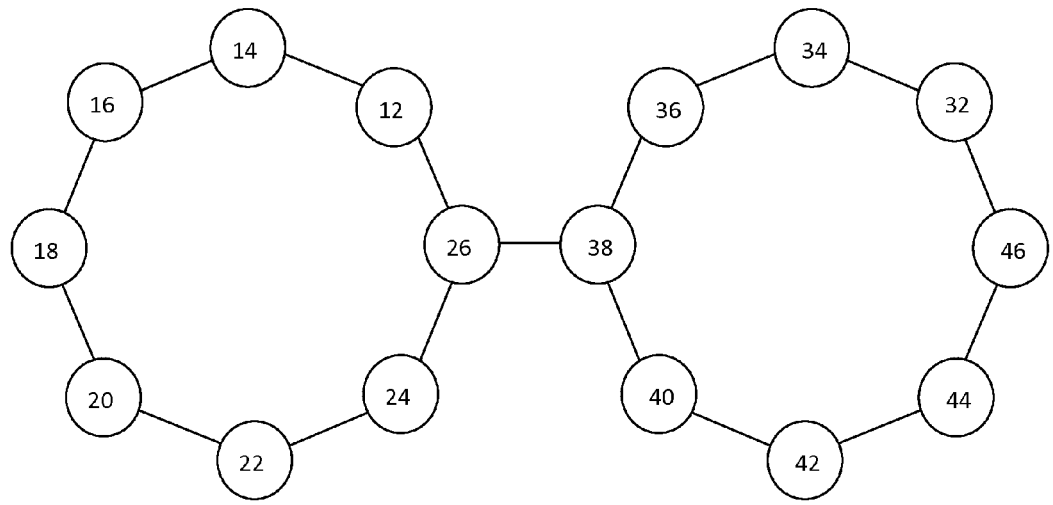
FIG. 3 is a graph representation of the building shown in FIGS. 1 and 2.

The region composed of floors 10, 12 can be represented as a graph of vertices and edges as in FIG. 3. Each zone 12, 14, 16, etc. is a vertex and is connected by one or more edges (represented by straight lines such as the connections 50) to at least one other vertex.

Thus, the zone 26 at the foot of the stairs on the first floor (FIG. 1) is connected to its adjacent zones 12, 24 and (via the staircase 30) to the zone 38 at the top of the stairs on the second floor (FIG. 2). In this representation the staircase is not assigned its own zone, and is simply a transition between zones. Other vertices such as zone 32 are only connected to a pair of neighbours 30, 34. Similarly, vertices can have more than three edges leading to other vertices, or can have a single connection, such as at the end of a corridor, or a room annexed off another room. Equally, a pair of connected vertices can have more than one edge connecting them, perhaps indicative of alternative routes between two zones.

By mapping the region of the first and second floors 10,12 to the graph of FIG. 3, one can determine a graph distance between vertices. By convention the distance between two vertices is determined by the number of edges in a shortest path between that pair of vertices. Thus the distance between the pair of vertices (32,34) is 1, while the distance (32,12) is 5.

Figure 4:
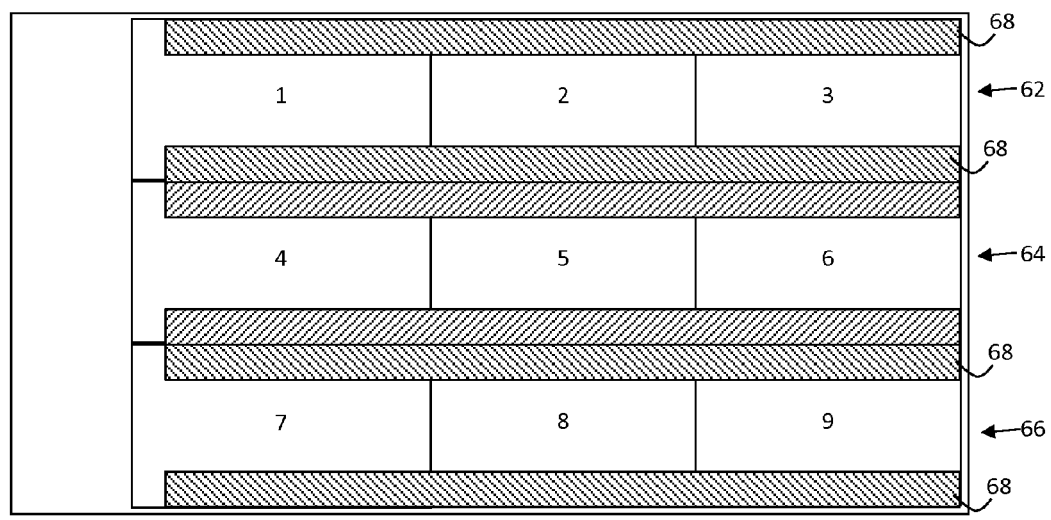
FIG. 4 is a layout of a different floor area.

FIG. 4 shown an alternative region 60, with a different form of layout, on a single floor. This floor layout has three aisles 62, 64, 66 such as one might find in a supermarket, with the aisles defined by and separated by shelves 68.

The first aisle 62 is divided into three zones 1, 2, 3; second aisle 64 is divided into three zones 4, 5, 6 and third aisle 66 is divided into three zones 7, 8, 9. Because the shelves 68 separate adjacent zones in adjacent aisles (such as preventing access directly from zone 6 to zone 3), the graph of the region will reflect this.

Figure 5:
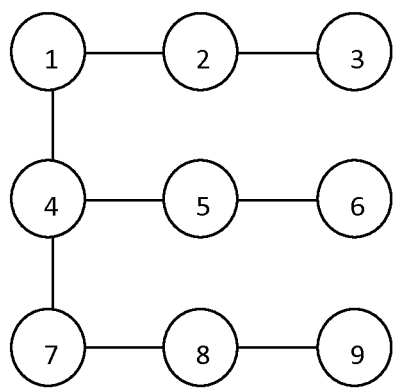
FIG. 5 is a graph representation of the floor area shown in FIG. 4.

FIG. 5 is a graph of the region 60, showing the vertices 1-9 and connecting edges. To illustrate that the shape chosen in representing the graph is not necessarily dictated by the shape of the region, FIG. 6 is another representation of the area which is identical in terms of the connections between vertices.

Figure 6:
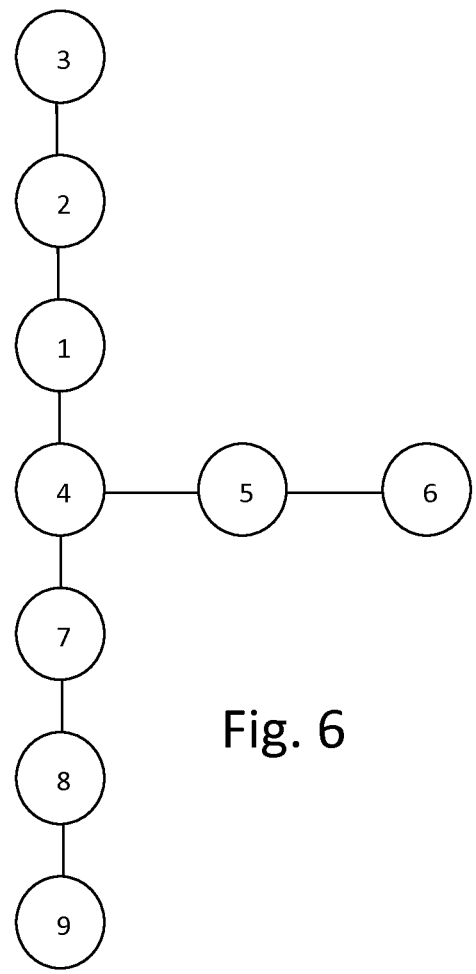
FIG. 6 is an alternative graph representation to FIG. 5 which is informationally identical.

Regardless of whether the region is shown as in FIG. 5 or FIG. 6, it is possible to instead represent the layout shown in FIG. 4 in graph notation using an edge tuple list. An edge tuple describes how the edge connects a pair of vertices (also referred to herein as nodes). For example the tuple (1,2) describes an edge that allows a transition from node 1 to 2. The full list of edge tuples used to describe the layout in FIG. 3 is provided in Table 1:

TABLE 1

[(1, 2), (1, 4),
(2, 1), (2, 3),
(3, 2),
(4, 1), (4, 5), (4, 7),
(5, 4), (5, 6),
(6, 5),
(7, 4), (7, 5),
(8, 7), (8, 9),
(9, 8)]

This edge tuple list conveys the same information about the zone layout of FIG. 4 as the representations in FIGS. 5 and 6. The first line in Table 1 tells us that if in zone 1 we can transition directly to zones 2 or 4. The second line tells us that if in zone 2 we can transition directly to zones 1 or 3. The third line tells us that if in zone 3, the only zone we can transition directly to is zone 2, and so on.

One example of generating a graph description from a zone layout has been given but many permutations are possible. Any applicable concepts or conventions found in graph theory may be used when deriving a graph description from a zone layout. Different notation from the example given may also be used to describe the zone layout.

In the example given the edges are not weighted (i.e. they have equal weight) and are bidirectional but it is possible to have a description with weighted edges and unidirectional edges. A unidirectional edge may be appropriate where a physical feature such as a turnstile only allows transition in one direction. If weights are used they may be derived in a number of ways but one potential weighting scheme is the use of physical distance between zones. Another is the observed traffic pattern between zones. Another is the presence or absence of barriers (whether physical or even behavioural) between zones. For example stores such as IKEA™ are designed to promote a single route which all users follow throughout the store. While there may be "short cuts" between adjacent points on the route, there can be physical barriers (a swinging door) between adjacent points, or there can be behavioural or psychological barriers ("I have to cut through this display area to take a short cut, but everyone else is staying on the prescribed path").

Another is the user's navigation history, or the navigation patterns of all users or particular groups or demographics of users. For example, perhaps a particular user or group of users (pet owners who have no children) when in zone 2 are very unlikely to visit zone 3 where baby products are stocked, but the same group of users is very likely when in zone 5 to visit zone 6 where pet food is stocked. The weightings can be tailored to such user groups.

2—Distance Matrix

With a graph description of the zone layout in place the first step in generating the graphical model is complete. Step two is to build a distance matrix from the graph. In this context a distance matrix describes the number of zones to be traversed in order to get from any zone to any other zone in the layout. The matrix will always be square with size determined by the number of zones. For example, the 9-zone layout above results in a 9×9 distance matrix. A 5-zone layout would require a 5×5 distance matrix and so on.

A distance matrix D is created such that $d_{i,j}$ is the distance from node i to node j and $d_{i,j}>0$.

Where distance is given by the sum of the edge weighting along the path from node i to node j, and a suitable constant is added to prevent zero values when i is equal to j. Conventional graph theory assigns distance within a graph by counting the number of edges, so that the distance from one vertex to itself is always zero; in the example below, the number of edges plus 1 is used as the distance, so that the distance from one vertex to itself is deemed to be 1, and the distance to a nearest neighbour is deemed to be 2, and so on.

A sample distance matrix generated from the graph of the example 9-zone layout is shown in Table 2. As the graph described has no edge weights a simple hop count was used to calculate distance. The distance matrix D in Table 2 was created such that di,j is the number of hops+1 from node i to node j.

TABLE 2

[[1 2 3 2 3 4 3 4 5]
[2 1 2 3 4 5 4 5 6]
[3 2 1 4 5 6 5 6 7]
[2 3 4 1 2 3 2 3 4]
[3 4 5 2 1 2 3 4 5]
[4 5 6 3 2 1 4 5 6]
[3 4 5 2 3 4 1 2 3]
[4 5 6 3 4 5 2 1 2]
[5 6 7 4 5 6 3 2 1]]

The matrix D in Table 2 gives us an understanding of how far zones are from each other. The diagonal line (top left to bottom right, all of value 1) are the lowest distances in the matrix and represent staying put in a given zone i.e. "transitioning" from zone 1 to 1, from zone 2 to 2 etc. The largest distance in the matrix is 7 and can be found at positions $d_{9,3}$ and $d_{3,9}$. This tells us that zones 3 and 9 are further apart than any other pair of zones in the layout. With a distance matrix description of the zone layout in place, we proceed to building a transition potential matrix.

3—Transition Potential Matrix

An empirical transition potential matrix T is created from the zone layout graph's distance matrix such that $t_{i,j}$ is the likelihood (unnormalized probability) of transitioning from node i to node j. This is computed as:

$$t_{i,j} = f(d_{i,j}, \sigma)$$

Where $d_{i,j}$ is an element of the distance matrix D and is the distance from node i to node j, $\sigma$ is a tuneable scale parameter that can dampen/increase transition potential, and $f$ is a suitable function for converting distance into transition potential. Depending on the scenario different functions may suit this task for example variations of the inverse square, the natural log, the exponential function etc. could be used.

A variant on the exponential function is given as an example below and it will be used to generate a sample transition potential matrix.

$$t_{i,j} = e^{\left(\frac{-d_{i,j}^2}{2\sigma^2}\right)}$$

The transition potential matrix generated from the distance matrix of the example nine zone layout is shown in FIG. 7. In this case $\sigma=0.6$ this dampens the possibility of transitioning, and consequently the largest values are found on the diagonal from top left to bottom right. This tells us that if in zone 1 the greatest likelihood is that you will stay in zone 1, if in zone 2 it is most likely that you will stay in zone 2 etc.

4—Normalised Transition Probability Matrix

The next step is to create a normalised transition probability matrix by scaling the transition probability matrix T so that it is doubly stochastic (all rows and columns sum to unity). There are a number of approaches that can be taken to do this but one possibility is to implement the Sinkhorn-Knopp algorithm described in R. Sinkhorn and P. Knopp. *Concerning nonnegative matrices and doubly stochastic matrices*. Pacific Journal of Mathematics., 21(2):343-348, 1967. The normalised transition probability matrix generated from the transition potential matrix of the example nine-zone layout is shown in FIG. 8.

What does the transition probability matrix tell us about the zone layout? Looking at row 1 of the matrix of FIG. 8 for example, it can be seen that if the device is in zone 1 it is most likely it will stay in zone 1 between one measurement and the next. The next most likely zones it will be in, in the very near future, are neighbouring zones 2 and 4, and the least likely is the far away zone 9.

In scenarios where velocity is also being measured it is possible to make the value of a function of velocity and to vary the matrix accordingly. The probability of staying in the same zone would then decrease with increasing velocity and probabilities of transitioning to other zones would increase. This means one can maintain accuracy for smaller zones and higher speeds. The normalised transition probability matrix is the graphical model to be used in graphical model enhancement of an existing location prediction.

Using the Graphical Model to Improve Location Prediction

The graphical model is used in conjunction with another location prediction technology to give more accurate location predictions. How this works will now be explained. To recap:

There is a location with a zone layout.

There are mobile devices whose location we wish to determine at the zone level i.e. device a is in zone b.

A predictive technology is in place that indicates what zone the device is in at regular intervals, via a probabilistic output.

Generating the graphical model involves:

Starting with the zone layout used in location prediction. Use graph theory to represent the zone layout as a graph.

Generating a distance matrix from the graph where the distance matrix D is created such that $d_{i,j}$ is the number of hops+1 from node i to node j.

From the distance matrix generating a transition potential matrix T such that:

$$t_{i,j} = e^{(-d_{i,j}^2/2\sigma^2)}$$

where σ>0 and is a tunable parameter.

Creating a normalized transition probability matrix by scaling T so that it is doubly stochastic. This matrix is the basis of the graphical model used in graphical model enhancement.

A machine learning algorithm is one potential predictive technology. One example of how this might work is as follows. A number of RF beacons are placed at fixed locations and they broadcast signals at periodic intervals. The mobile devices have a receiver that corresponds with the RF technology being used, Wi-Fi being one example of an RF technology that could be used. Location is predicted based on prior/learned knowledge of the RF characteristics present within the zone layout. This has been described above in terms of environmental wireless fingerprints being detected and compared with a database. Using machine learning the database can be updated over time to take account of new observations and changes in the environment.

A typical output in this scenario would be a list of the probabilities that the device is in each zone. An example prediction for the 9-zone layout is shown in Table 3:

TABLE 3

| | Zone | | | | | | | | |
|---|---|---|---|---|---|---|---|---|---|
| | 1 | 2 | 3 | 4 | 5 | 6 | 7 | 8 | 9 |
| Probability | 0.8 | 0.05 | 0.01 | 0.05 | 0.02 | 0.01 | 0.01 | 0.03 | 0.02 |

This table can be expressed in matrix form as follows: [0.8, 0.05, 0.01, 0.05, 0.02, 0.01, 0.01, 0.03, 0.02]

Figure 9:
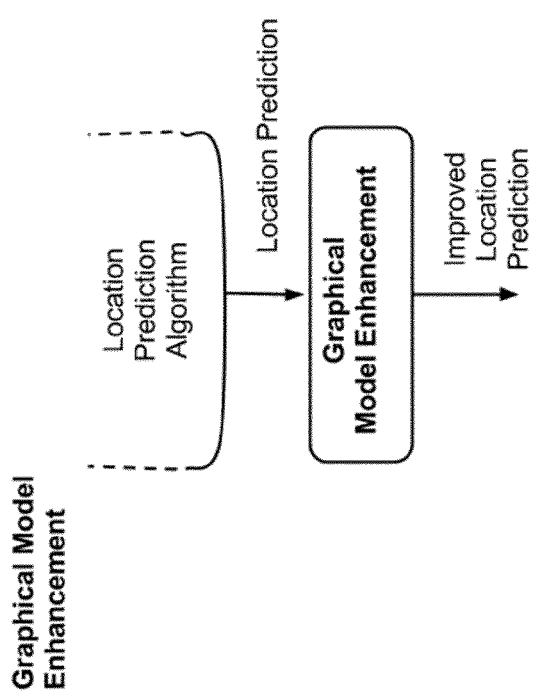
FIG. 9 is a flowchart of part of the method of the invention.

In this example it is predicted that the device is in zone one with a probability of 0.8, and this is seen as far likelier than any other probability in the table. At this point in a location prediction algorithm the graphical model enhancement can be added to improve location prediction as shown in FIG. 9, illustrating that the graphical model enhancement occurs after an initial prediction has been made.

Figure 10:
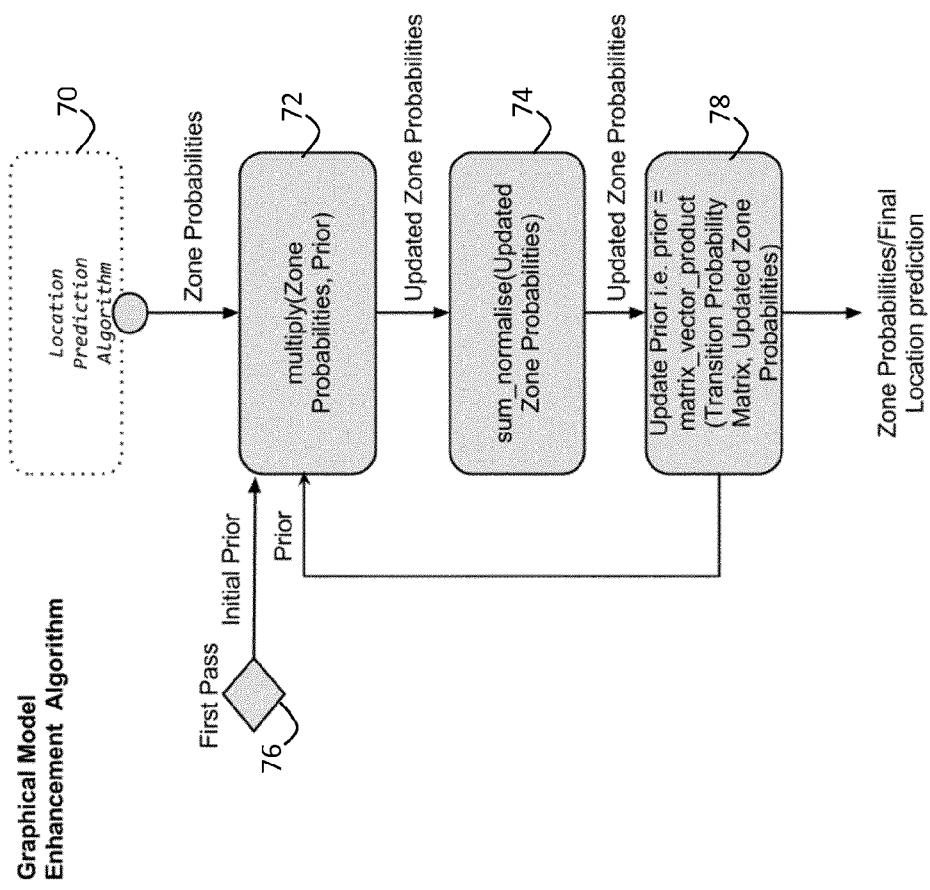
FIG. 10 is a more detailed flowchart of the steps of FIG. 9.

FIG. 10 shows the detailed operation of the graphical model enhancement. Again, it starts with input from an existing location predictor.

The list/vector of zone probabilities received from the location prediction algorithm 70 is updated by multiplying them 72 by a prior vector and normalising the result 74. This result is the enhanced location prediction.

On the first pass through the algorithm the prior must be initialised 76. This parameter may be tuned but using a uniform prior is one possibility, in the case of the 9-zone layout this would be; [1 1 1 1 1 1 1 1 1].

Finally the prior is updated 78 by replacing it with the matrix vector product of the transition probability matrix and the updated zone probabilities. This is the transition probability matrix whose generation we described earlier. The updated zone probabilities are output and give an improved location prediction to be used as required. The process repeats when the next location prediction is passed in, 70.

Experimental Results

In an experiment the performance effect of using the graphical model enhancement in addition to another indoor location prediction technology was measured.

Figure 11:
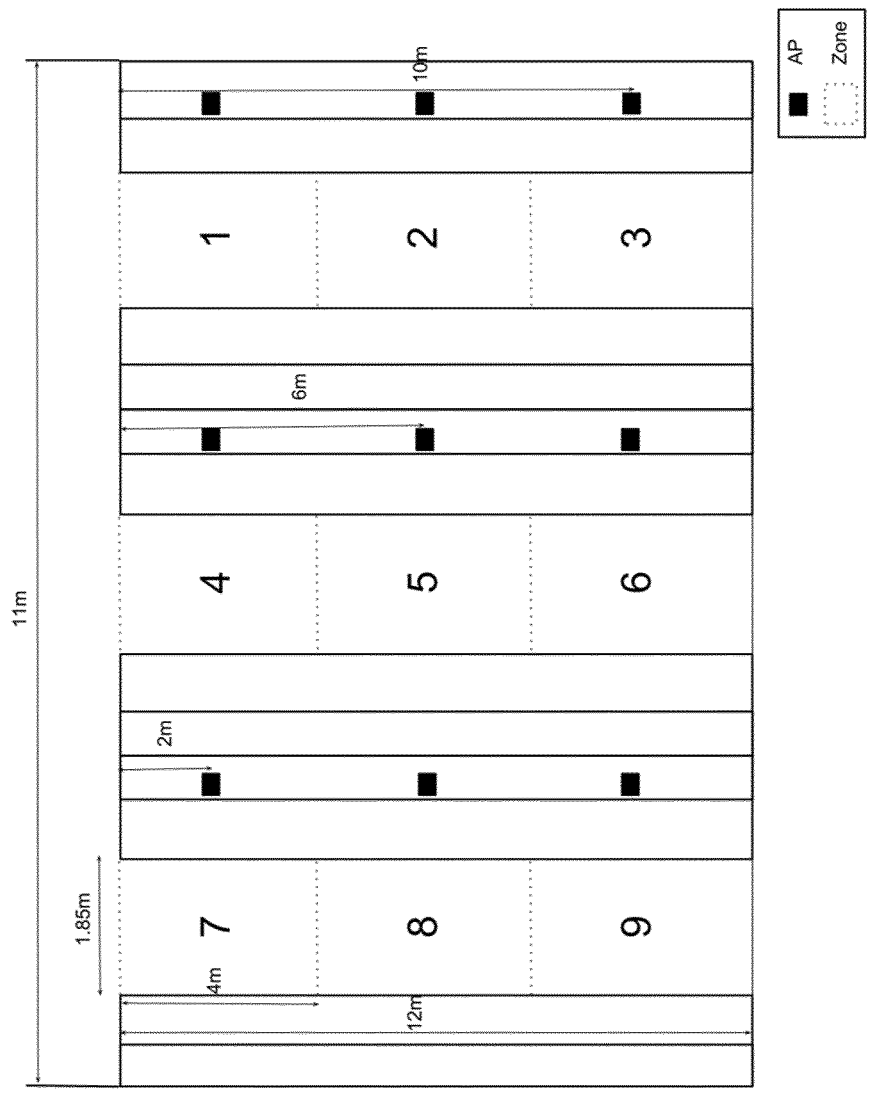
FIG. 11 is a layout of a floor area used in trials.

The zone layout is a 9 zone layout as shown in FIG. 11. The zones 1 to 9 were separated into three aisles each of dimension 1.85 m×12 m, each zone being of dimension 1.85 m×4 m. The RF Hardware used consists of 9 identical off-the-shelf Wi-Fi Access Points (APs) of make Buffalo WHR-HP-G300N, from Buffalo Technology, Austin, Tex. (Buffalo is a trade mark). These access points were situated in the areas dividing the aisles, with three APs between aisle 4-6 and aisle 7-9 at distances of 2 m, 6 m, and 10 m respectively from the head of the aisle, i.e. in a line with the midpoint of each zone. Three more APs were in the dividing are between aisle 1-3 and aisle 4-6, at the same spacing, and the final three were in the area outside aisle 1-3.

Four mobile devices were used in the experiment: two Nexus 7 tablets (produced by ASUStek Computer Inc. of Taipei, Taiwan); one Samsung Captivate smartphone (produced by Samsung of Seoul, Korea); and one HTC Desire S smartphone (produced by HTC Corporation of Taipei, Taiwan). (Nexus, Asus, Samsung, Captivate, HTC and Desire S are trade marks.)

The indoor location technology used to make the initial prediction was based on machine learning using support vector classification. An off the shelf implementation of a Support Vector Machine (SVM) called LIBSVM was used. (See Chih-Chung Chang and Chih-Jen Lin, *LIBSVM: a library for support vector machines*, ACM Transactions on Intelligent Systems and Technology, 2:27:1-27:27, 2011. Software available at http://www.csie.ntu.edu.tw/~cjlin/libsvm, and see the documentation at http://www.csie.ntu.edu.tw/~cjlin/papers/guide/guide.pdf.)

Training data is required to train the SVM classifier so it can classify/predict location. The data used was a recording of received signal strength values in dBm of the beacons from the 9 Wi-Fi access points as seen from each of the 9 zones. These values are sometimes referred to as Received Signal Strength Indication (RSSI). A single sample in LIBSVM format is as follows:

1:−44.0 2:−53.0 3:−51.0 4:−65.0 5:−56.0 6:−59.0 7:−58.0 8:−58.0 9:−63.0

In this sample, the first value (1) is the zone the recording is taken in and the remaining nine pairs are access point id (1, 2, etc.) and received signal strength (44.0, 53.0, etc.). Thus, in this example access point 1 had a received signal strength of −44 dBm when the device which recorded this signal was situated in zone 1.

Figure 13:
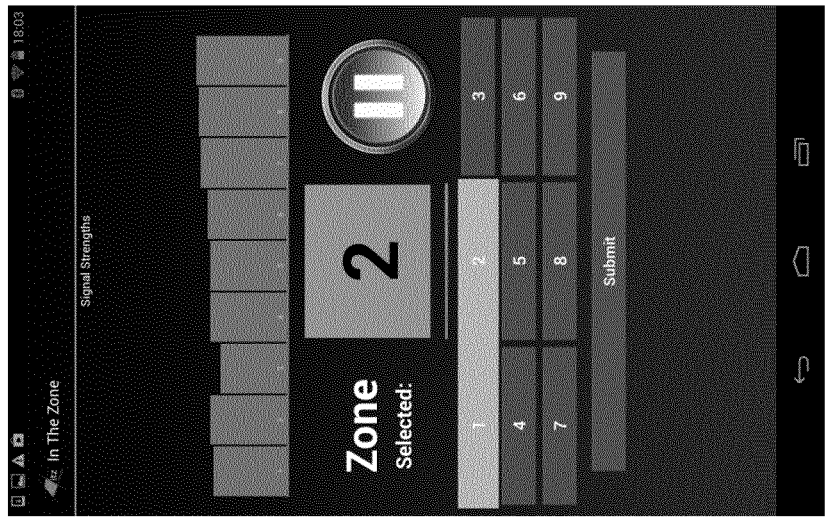
FIGS. 12 and 13 are screenshots of an application used to record signal values.
Figure 12:
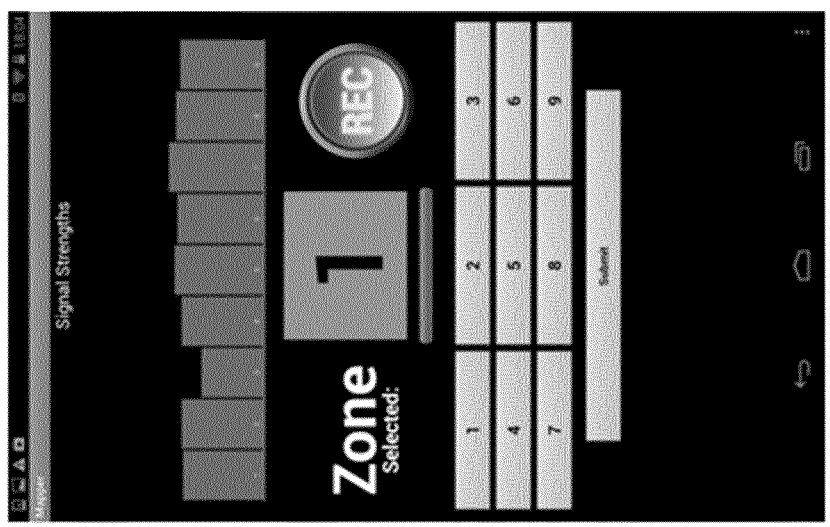

FIGS. 12 and 13 are screenshots of a simple Android® app created to record these values. This app records Wi-Fi signal strengths and the zone the device is in, populating a database with the LIBSVM values. The API provided by the android.net.wifi package from the Android OS APIs (http://developerandroid.com/reference/android/net/wifi/package-summary.html) was used to record Wi-Fi signal level values. The current zone is set by the user via a button interface. In FIG. 12, the app is in its initial state, before starting to record. In FIG. 13, the app is in record mode, the user having selected zone 2 as the current location.

The result of a scan is a set of values for the following fields:

| Field type | ID | Description |
|---|---|---|
| public String | BSSID | The address of the access point. |
| public String | SSID | The network name. |
| public String | capabilities | Describes the authentication, key management, and encryption schemes supported by the access point. |
| public int | frequency | The frequency in MHz of the channel over which the client is communicating with the access point. |
| public int | level | The detected signal level in dBm. |
| public long | timestamp | Time Synchronization Function (tsf) timestamp in microseconds when this result was last seen. |

The training data was gathered using one of the Nexus 7 devices. Approximately 90-100 samples were recorded from within each zone. The recording was made using the following protocol:
- Go to the first zone with the device, turn on the app, select the current zone and press record.
- Perform a random walk within the zone while recording
- When 90 samples are recorded, pause recording
- Move to the next zone, select the zone and press record
- Repeat until data has been recorded for all zones.

This data gathering process was repeated using the remaining three devices. The resulting recordings provide test data that can be used when simulating the performance of location detection after an SVM classifier had been generated using the training data.

The training data was used in conjunction with LIBSVM to generate an SVM classifier that would provide an initial location prediction. It is possible to measure the accuracy of this classifier when predicting location using the test data and tools provided by LIBSVM. The parameters used when generating the SVM classifier are summarized in table 4.

TABLE 4

LIBSVM parameters used when generating SVM classifier
LIBSVM Parameters

| | |
|---|---|
| Scaling | [0, 1] |
| C | 2.0 |
| Kernel Function | Radial Basis Function (RBF) |
| Gamma (γ) | 0.1 |

The LIBSVM parameters of Table 4 are as follows:
Scaling [0,1]: All attribute e.g. signal strength are scaled between zero and 1
C>0 is the penalty parameter of the error term
The kernel function used is a radial basis function, LIBSVM offers a choice of four the other three are linear, polynomial and sigmoid.
Gamma is a parameter of the kernel function.

We then simulated the accuracy of location prediction using the SVM Classifier in conjunction with Graphical Model Enhancement. The Graphical Model Enhancement was implemented in the programming language Python. The python implementation code is as below.

```
def simulate_graphical_model(T, classifier, features):
    """Simulate the graphical model with transition matrix T using
        the given classifier on the given set of sequential features
    """
    n = T.shape[0]
    # Uniform prior over possible zones
    prior = ones(n) / float(n)
    posterior = zeros(n)
    history = [ ]
    for i in range(features.shape[0]):
        feature_vector = features[i,:]
        likelihood = classifier.predict_proba(feature_vector).ravel( )
        posterior = likelihood * prior
        posterior /= posterior.sum( )
        history.append(posterior)
        prior = np.dot(T, posterior)
    return np.array(history)
```

The transition potential matrix used was derived in an identical fashion to the one found in FIG. 8. One hundred runs were performed to eliminate any noise in the simulation. The implementation is as summarized previously in FIG. 10, except in this instance the location prediction algorithm providing the initial value is a specific algorithm i.e. an SVM classifier. The results are presented and analyzed in the next section.

Results and Analysis

The results of the experiment are summarised in Table 5 below. The simulated accuracy of location prediction using an SVM classifier trained using a Nexus 7 when trying to determine the location of another Nexus 7 was about 71%, without the graphical model enhancement. Accuracy dropped to about 61% when trying to determine the location of a Samsung Captivate and still further to around 46% for the HTC Desire S. In summary, location prediction was poor when trying to locate a device of the type trained for and worse when trying to locate devices of other makes/models.

TABLE 5

Results demonstrating technical effect of Graphical Model Enhancement
Location Detection Accuracy (%)

| Device | Machine Learning | Machine Learning + Graphical Model Enhancement | Increase |
|---|---|---|---|
| Nexus 7 | 71.18 | 91.93 | 20.76 |
| Samsung | 61.18 | 78.03 | 16.85 |
| HTC | 46.46 | 66.45 | 19.99 |

When the machine learning algorithm was used in conjunction with Graphical Model Enhancement the accuracy of location prediction increased in all cases. For the Nexus 7 it increased by 20.76 percentage points up to almost 92%. In the case of the Samsung Captivate it rose 16.8 percentage points up to a little over 78% and for the HTC Desire S accuracy was up approximately 20 percentage points to 66%.

The accuracy figures for machine learning plus Graphical Model Enhancement are average values from 100 simulation runs. The spread of this data is visualised using box plots in FIG. 14.

Figure 14:
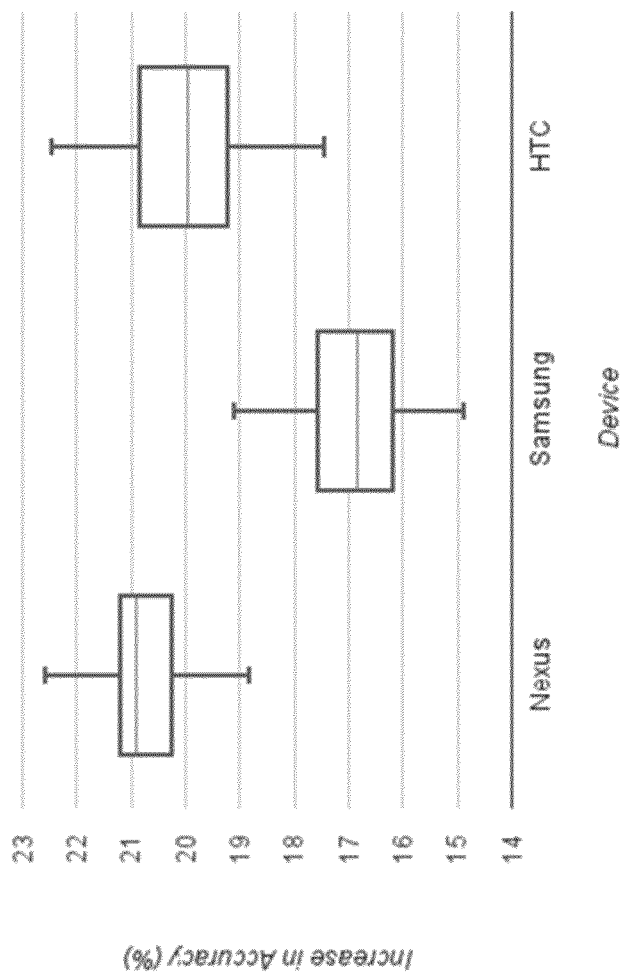
FIG. 14 is a box plot graph illustrating the accuracy of the method of the invention.

In FIG. 14, the box plots visualise the spread of the 100 measurements of increase in accuracy (%) for each device, the Nexus 7, Samsung Captivate and HTC Desire S. From the box plots we can see that the increase in accuracy achieved is stable as the range of the measured values is relatively small. Across the three devices, with 300 total measurements, the increase in accuracy only ranges from about 14.9 percentage points to 22.7 percentage points. The lowest increase in accuracy measured is 14.9 percentage points and this still offers a substantial increase in accuracy.

The present invention also provides a method for improving cross-device accuracy. The present inventors have found that a location detection model trained with one type of device is accurate for devices of that type but may not be accurate for other makes and models. For example, a model trained with a Nexus 7 tablet is accurate for other Nexus 7s but not for different devices like say a Samsung or HTC smartphone. The present invention provides a model accurate for all devices in order to achieve cross-device accuracy.

As mentioned above, the measured signal strengths may be adjusted before comparison using one or more of the following transformations:

- in the event of no signal being detected from a previously detected wireless signal source, replacing a null value for said source with a previously measured value;
- normalising the signal strength values to a common range;
- shifting the signal strength values to reduce differences between wireless characteristics of the mobile device and those of a reference device from which the reference signal strengths were derived; and
- calculating a standard z-score as follows:

$$Z = \frac{x - \mu}{\sigma}$$

where x is the measured signal strength, $\mu$ is the mean signal strength, and $\sigma$ is the standard deviation.

The transformations above allow the measured signal values to be adjusted to take account of different signal receiving and signal processing abilities between disparate devices of different types. It has been found that dropping null values, normalising to a common range, and shifting the signal strength values can each greatly reduce errors and improve consistency of measurement between devices with different antennae, different wireless cards and chips, and different radio processing hardware and firmware.

Figure 15:
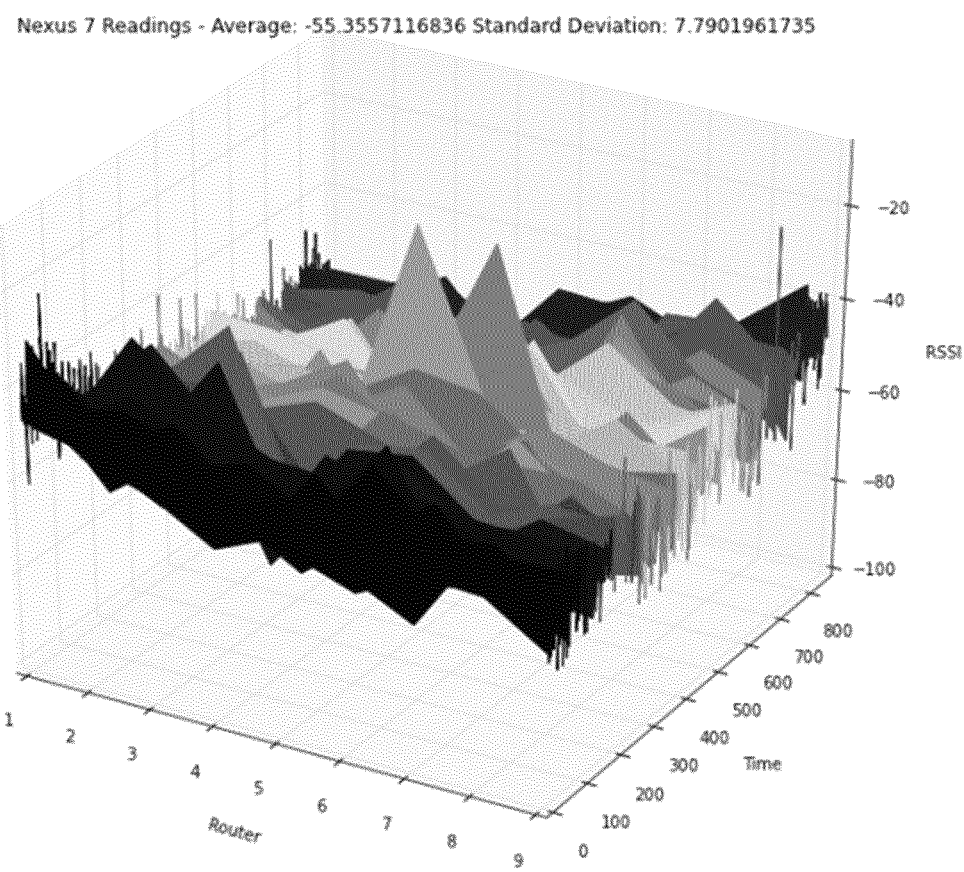
FIG. 15 is a plot showing signal strength (dBm) data gathered when training with a Nexus 7® mobile device.

In experiments conducted, three devices were used; a Nexus 7 to train models and two devices to test accuracy on other devices; a second Nexus 7, and a Samsung Captivate smartphone. The signal strength (dBm) data gathered when training with the Nexus 7 is shown in FIG. 15.

Figure 16:
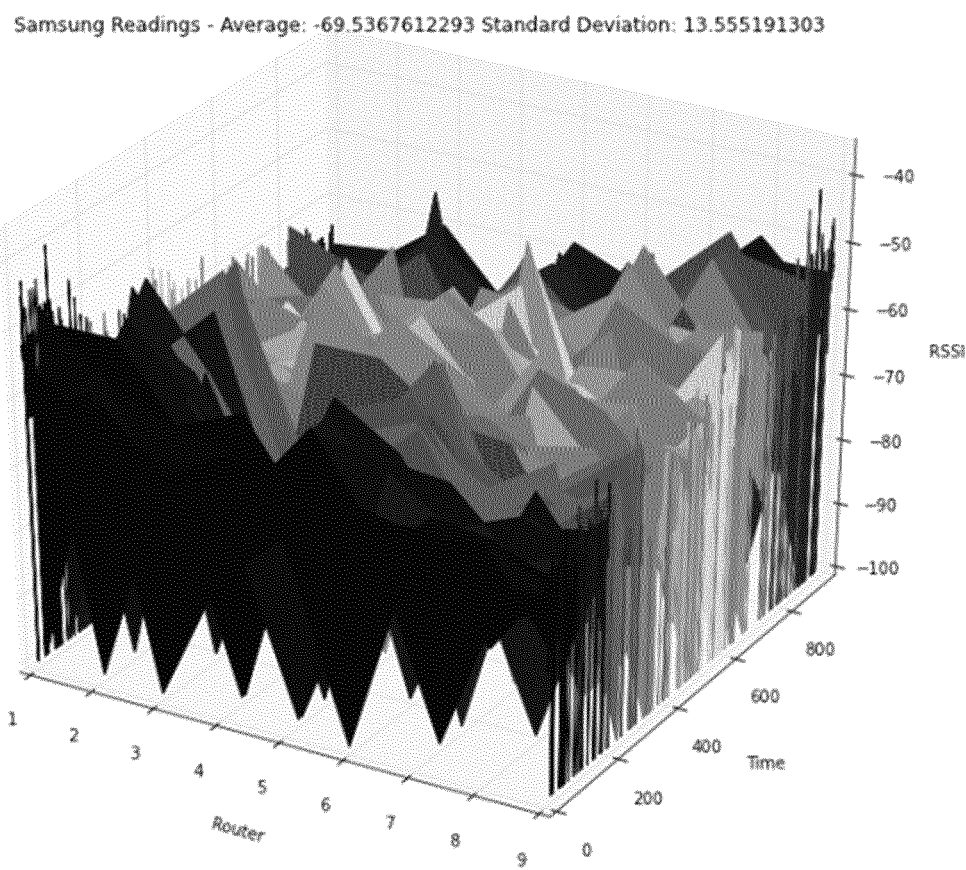
FIG. 16 is a plot showing signal strength data obtained with a Samsung Captivate® smartphone.

The type of readings obtained with the Samsung can be seen in FIG. 16. Note, when no signal is read from a beacon, a zero/floor value is set, this is −100 dBm.

From this data, it can be seen that the Samsung has a much lower receive sensitivity and on the whole has lower signal readings. This also results in far more missed beacons as evidenced by all the values of −100 dBm. Looking at accuracy across devices results were obtained as shown below in Table 6.

TABLE 6

Results demonstrating technical effect of Graphical Model Enhancement Location Detection Accuracy (%)

| Device | Machine Learning | Machine Learning + Graphical Model Enhancement | Increase |
|---|---|---|---|
| Nexus 7 | 73.6486486486 | 95.6081081081 | +21.9594594595 |
| Samsung | 21.0638297872 | 27.4468085106 | +6.3829787234 |

Figure 17:
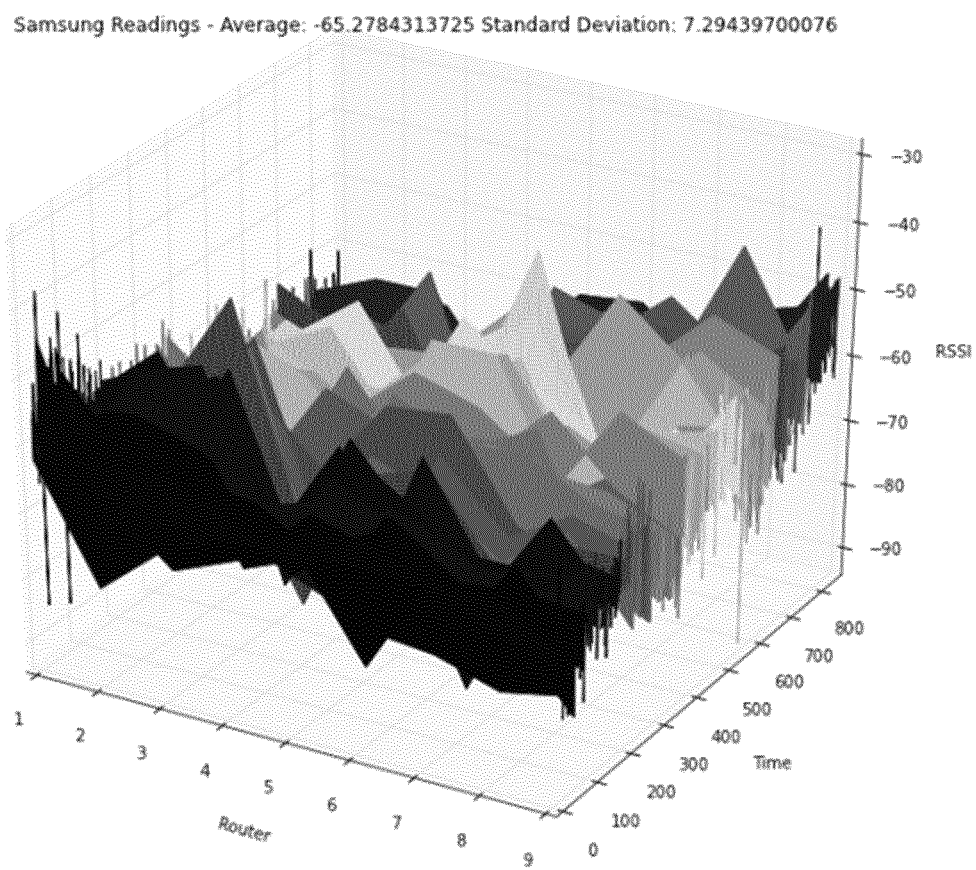
FIG. 17 is a plot showing signal strength data obtained with the Samsung Captivate smartphone with all missing readings cleared.

From the above, it can be seen that relatively good accuracy can be achieved for another Nexus but accuracy is relatively poor for a different device like the Samsung. In order to improve accuracy, all the missing readings on a device with lower receive sensitivity can be cleared. Thus, instead of setting a missed beacon to −100, the zero/floor value is set to a previously measured value. The result is a cleaner looking data set from the Samsung device, as illustrated in FIG. 17.

Accuracy tests run again showed an immediate improvement, as shown in Table 7 below.

TABLE 7

Results demonstrating technical effect of Graphical Model Enhancement Location Detection Accuracy (%)

| Device | Machine Learning | Machine Learning + Graphical Model Enhancement | Increase |
|---|---|---|---|
| Nexus 7 | 71.178529755 | 93.4655775963 | +22.2870478413 |
| Samsung | 51.0588235294 | 73.4117647059 | +22.3529411765 |

Accuracy for the Samsung device is now approaching useable levels but further improvement is required. Next the RSSI values were scaled between 0 and 1 using best guess max and min receivable values for RSSI. Having scaled the data the accuracy results are as shown below in Table 8.

TABLE 8

Results demonstrating technical effect of Graphical Model Enhancement Location Detection Accuracy (%)

| Device | Machine Learning | Machine Learning + Graphical Model Enhancement | Increase |
|---|---|---|---|
| Nexus 7 | 71.178529755 | 92.9988331389 | +21.8203033839 |
| Samsung | 61.1764705882 | 79.4117647059 | +18.2352941176 |

Figure 18:
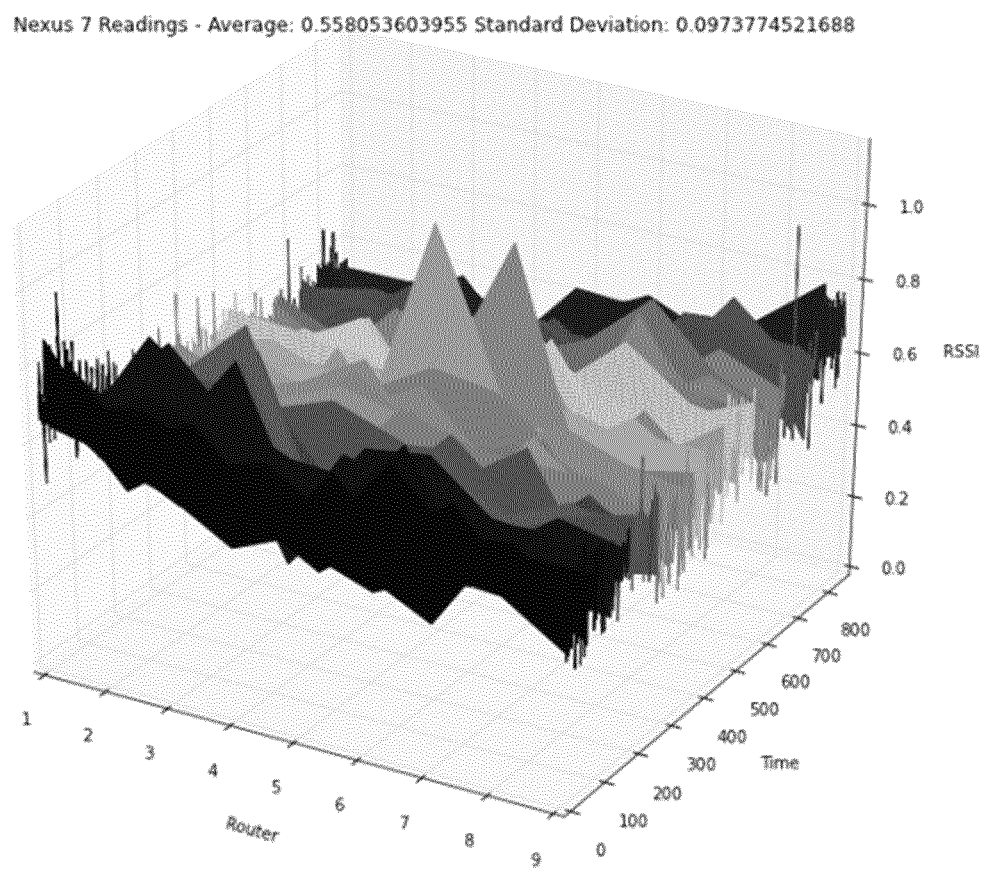
FIGS. 18 and 19 are plots showing signal strength data obtained with the Nexus and Samsung smartphones scaling Received Signal Strength Indication (RSSI) values between 0 and 1 using best guess max and min receivable values for RSSI.
Figure 19:
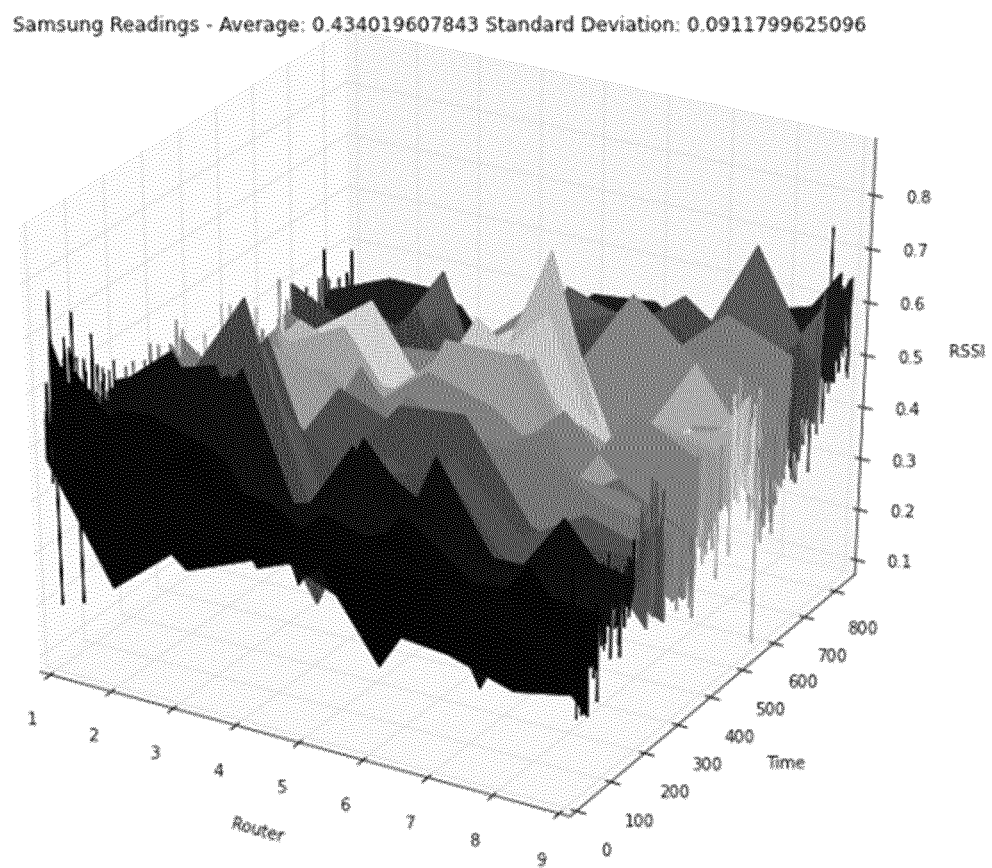

As shown above, the accuracy of the Samsung device improved again. The scaled data in use is illustrated in FIGS. 18 and 19.

Comparing the two data sets the Samsung values are on average lower than the Nexus 7 (due to a lower receive sensitivity). Shifting the values up to account for the lower receive sensitivity improved accuracy. Applying a "best guess" shift provided the following accuracy results as shown in Table 9 below.

TABLE 9

Results demonstrating technical effect of Graphical Model Enhancement Location Detection Accuracy (%)

| Device | Machine Learning | Machine Learning + Graphical Model Enhancement | Increase |
|---|---|---|---|
| Nexus 7 | 0.71178529755 | 0.928821470245 | +0.217036172695 |
| Samsung | 0.64117647058 | 0.861176470588 | +0.22 |

This scale and shift operation is in fact a simple linear transform and gives very useable accuracy across devices. The choice of parameters for device specific linear transforms may be used to set up a database of values for popular devices. If this process uses parameters based on characteristics obtainable from the data, then values may be generated for new/unseen devices automatically by sourcing data from users. It may be possible to choose device specific parameters by doing some simple statistical analysis of recorded signal strength readings. One example of this is to convert the data to standard units or z-scores. This only requires simple analysis of sample data to get average signal strength and standard deviation. Z-scores may be calculated as follows:

$$z = \frac{x - \mu}{\sigma}$$

Where x is the signal strength measurement to be transformed to a z-score, $\mu$ is the mean signal strength, and $\sigma$ is the standard deviation.

Testing this method as a means of parameter tuning and using an additional device, a HTC Desire S, gives the following results as shown in Table 10.

TABLE 10

Results demonstrating technical effect of Graphical Model Enhancement Location Detection Accuracy (%)

| Device | Machine Learning | Machine Learning + Graphical Model Enhancement | Increase |
| --- | --- | --- | --- |
| Nexus 7 | 0.709451575263 | 0.932322053676 | +0.222870478413 |
| Samsung | 0.684705882353 | 0.891764705882 | +0.207058823529 |
| HTC | 0.733905579399 | 0.937768240343 | +0.203862660944 |

Accuracy levels are now approaching 90%+ across devices. This approach not only improves cross device accuracy but also potentially automates the addition of support for new devices.

From these results we can see that Graphical Model Enhancement can significantly improve the accuracy of a predictive technology that indicates what zone the device is in at regular intervals, via a probabilistic output. It will also help to maintain accuracy across devices by mitigating loss of accuracy caused by the varying characteristics of different makes and models of mobile devices. In the example given, a machine learning algorithm trained to detect location with one device has poor accuracy for other makes and models. Using this machine learning algorithm in conjunction with the graphical model increases accuracy for the trained device as well as other makes and models of devices.

The invention claimed is:

1. A method for detecting the location of a mobile device within an area, comprising the steps of:
   storing a prior location estimate for the device;
   determining, for each of a plurality of zones in said area, a signal-based value indicative of the likelihood of the device being located in the respective zone, based on measured wireless signal characteristics;
   maintaining a set of transition values, each transition value representing a likelihood of a device moving between a pair of said zones;
   calculating, for each of a plurality of zones in said area, a current location value by using a matrix-based approach to combine (i) the prior location estimate, (ii) said set of transition values, and (iii) said signal-based values;
   wherein said set of transition values includes at least one transition value representing the likelihood of the device moving between a pair of zones which are physically accessible from one another and at least one transition value representing the likelihood of the device moving between a pair of zones which are physically inaccessible from one another; and
   wherein said step of calculating a current location value includes:
      using a discriminative model to calculate a current location value for at least one zone physically accessible from a zone corresponding to the prior location estimate, and a current location value for at least one zone physically inaccessible from said zone corresponding to the prior location estimate; and
      determining whether the device is in a boundary region adjacent to the meeting of two or more zones, wherein for each candidate location Li of n location candidates L1, L2, L3, . . . , Ln, a probability value $P(L_i)$ is assigned according to the likelihood of the device being in that candidate location, and wherein the determination that the device is in a boundary region between two locations Li, Lj is made where the following conditions are met:
      $P(L_i|s) > P(L_j|s) > P(L_k|s)$, for i, j, k=1, 2, 3, . . . , n, k≠j≠i, and $P(L_i|s) - P(L_j|s) < c$, where c is a tuneable parameter and c<1, and s is the observed signal strength vector on the mobile device.

2. The method of claim 1, wherein in a system of N zones, the prior location estimate comprises a set of N values (p1, p2, . . . pN); wherein the set of transition values comprises a set of $N^2$ values expressible as a N×N transition matrix T, and wherein the signal-based values comprise a set of N values (s1, s2, . . . sN); and wherein said step of calculating, for each of a plurality of zones in said area, a current location value comprises obtaining the matrix product of a 1×N matrix having elements [(p1×s1) (p2×s2) . . . (pN×sN)] and the transition matrix T, resulting in a 1×N location matrix whose elements e1, e2, . . . eN are indicative of the likelihood of the device being in each of the N zones respectively.

3. The method of claim 2, wherein said transition matrix T is doubly stochastic.

4. The method of claim 1, further comprising the step of storing one or more of said calculated current location values, and on a further iteration, using the stored current location values as the prior location estimate.

5. The method of claim 4, wherein on an initial iteration, the prior location estimate is initialised to a stored default value or set of values.

6. The method of claim 1, wherein the prior location estimate is stored as a set of values, each associated with a respective one of the plurality of zones, representing the likelihood of the device having been in the respective zone on a prior iteration of the method.

7. The method of claim 1, wherein said set of transition values is calculated from a representation of said zones as a graph of vertices and edges, each zone being represented as a vertex and being connected to at least one other vertex by an edge.

8. The method of claim 7, wherein said set of transition values is calculated such that each transition value is a function of the distance between a pair of vertices in the graph.

9. The method of claim 7, wherein the transition values between pairs of vertices are weighted.

10. The method of claim 9, wherein the weighting is assigned based on one or more of: physical distance between zones, physical barriers between zones, traffic patterns between zones, and time to transition between zones.

11. The method of claim 7, wherein each transition value is also a function of a tuneable parameter.

12. The method of claim 11, further comprising the steps of modifying said tuneable parameter and adjusting the transition values in consequence.

13. The method of claim 12, wherein said tuneable parameter is modified in accordance with a calculated or estimated speed of movement of the device.

14. The method of claim 12, wherein said tuneable parameter is modified in accordance with a calculated or estimated congestion value associated with movement within said area.

15. The method of claim 12, wherein said tuneable parameter is modified in accordance with a value associated with the time between successive iterations of the method.

16. The method of claim 1, wherein the step of determining signal-based values comprises measuring, by the device, a plurality of wireless signal strengths, and comparing said measured signal strengths with a set of reference signal strengths associated with each of the plurality of zones.

17. The method of claim 16, wherein the measured signal strengths are adjusted before comparison using one or more of the following transformations:
   a. in the event of no signal being detected from a previously detected wireless signal source, replacing a null value for said source with a previously measured value;
   b. normalising the signal strength values to a common range;
   c. shifting the signal strength values to reduce differences between wireless characteristics of the mobile device and those of a reference device from which the reference signal strengths were derived; and
   d. calculating a standard z-score as follows:

$$Z = \frac{x - \mu}{\sigma}$$

where x is the measured signal strength, $\mu$ is the mean signal strength, and $\sigma$ is the standard deviation.

18. The method of claim 17, comprising selecting device specific parameters for the transformations according to the specific type of mobile device used to measure the signal strengths.

19. The method of claim 18, wherein the device specific parameters are obtained by analysing measured signal strengths of the specific type of mobile device used.

20. The method of claim 1, wherein said step of calculating a current location value comprises adjusting the signal-based value for each zone according to a weighting derived from the prior location estimate, said weighting indicating the likelihood of the device having been in that zone on a previous iteration, resulting in an enhanced signal-based value for each of said zones; and combining the enhanced signal-based value for each zone with the transition values for each zone pair involving that zone, to result in a current location value for each zone.

* * * * *